US00RE34350E

United States Patent [19]

Dufossez

[11] E Patent Number: Re. 34,350

[45] Reissued Date of Patent: June 29, 1993

[54] TIE FORMED OF STRESSED HIGH-TENSILE STEEL TENDONS

[75] Inventor: Marcel E. Dufossez, Paris, France

[73] Assignee: Freyssinet International (STUP), France

[21] Appl. No.: 873,625

[22] Filed: Apr. 22, 1992

Related U.S. Patent Documents

Reissue of:

[64] Patent No.: 3,967,421
Issued: Jul. 6, 1976
Appl. No.: 592,527
Filed: Jul. 2, 1975

U.S. Applications:

[63] Continuation of Ser. No. 489,330, March 5, 1990, abandoned.

[30] Foreign Application Priority Data

July 9, 1974 France ..... 74.23819

[51] Int. Cl.[5] .....E04C 3/10; E04C 5/08

[52] U.S. Cl. .....52/146; 52/149; 52/223.13

[58] Field of Search .....52/146, 147, 150, 151, 223, 52/230, 224; 14/21, 22; 403/266, 267

[56] References Cited

U.S. PATENT DOCUMENTS

| | | | |
|---|---|---|---|
| 2,677,957 | 5/1954 | Upson | 52/230 |
| 2,751,660 | 6/1956 | Nakonz | 52/230 |
| 3,152,668 | 10/1964 | Smith | 52/148 |
| 3,422,501 | 1/1969 | Yoshimura | 52/230 |
| 3,498,013 | 3/1970 | Kern | 52/230 |

FOREIGN PATENT DOCUMENTS

| | | |
|---|---|---|
| 664827 | 6/1963 | Canada . |
| 905347 | 4/1945 | France . |
| 1,658586 | 6/1970 | United Kingdom . |
| 721517 | 1/1955 | Germany . |
| 1,042972 | 9/1966 | United Kingdom . |

*Primary Examiner*—Richard E. Chelcot, Jr.
*Assistant Examiner*—Kien T. Nguyen
*Attorney, Agent, or Firm*—Keck, Mahin & Cate

[57] ABSTRACT

A tie for connecting together parts of a structure, for example a stay for suspending the deck of a bridge from a tower, is constructed so that its length can be adjusted in a simple manner with the tie in service. The tie is made up from several stressed steel tendons, enclosed in a protective sheath filled with hardened material. At its ends the sheath incorporates anchoring devices for the transfer of the pull from the tie to the structure. The sheath forms a conduit whose ends are fixed securely to the anchoring devices. The conduit is isolated, throughout its length, from the structure so as to be capable of sliding longitudinally with respect thereto. At least one of the anchoring devices includes connection means for the active part of a tensioning apparatus and also includes means for bearing against the structure. This bearing means is adjustable on the anchoring device in the longitudinal direction of the tie.

17 Claims, 2 Drawing Sheets

Figure 1:
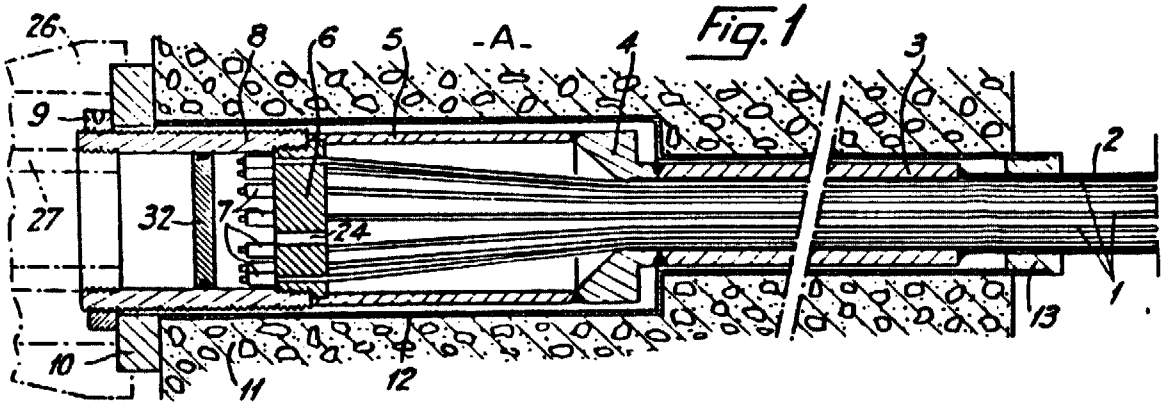

-A-
1
2
3
4
5
6
7
8
9
10
11
12
13
24
26
27
32

-B-
1
2
3
4
5
15
16
17
18
19
22
23
30

TIE FORMED OF STRESSED HIGH-TENSILE STEEL TENDONS

Matter enclosed in heavy brackets [ ] appears in the original patent but forms no part of this reissue specification; matter printed in italics indicates the additions made by reissue.

*This is a continuation of application Ser. No. 07/489,330 filed Mar. 5, 1990, now abandoned which is a Reissue application of U.S. Pat. No. 3,967,421 issued July 2, 1975.*

This invention relates to a tie formed of stressed high-tensile steel tendons.

It has already been proposed, in large construction works, to employ stays or other free, normally stressed ties in the form of assemblies which are similar to prestressed cables, that is to say bundles of tendons (wires, strands or steel bars) surrounded by a sheath filled with a hardenable protective material, in general a cement motar.

One disadvantage of the known embodiments of this type is the practical impossibility, after the installation of such ties, of modifying their length, which, for important permanent structures such as cable-stayed bridges, is an essential requirement for a long period, sometimes several years.

Since it is quite impossible to act on the tendons locked in their sheath, the only course available is to act on the anchoring devices which connect the tie to the structure. This can be done by adjusting the position of the anchoring devices employing shims of suitably chosen thickness. It will be noticed that this implies imposing an over-tension on the tie in order to insert the shims before the anchoring devices are allowed to bear on them.

These known ties have also another disadvantage. In their free portion, the tendons making up the tie remain rectilinear but at the anchoring devices powerful lateral forces are exerted in order to hold them in position and, in addition, the tendons are frequently splayed out into one or more conical groups. This imposes additional stresses on them at the points of flexion, and reduces their resistance to fatigue.

A first object of this invention is to overcome the disadvantages mentioned above by providing a tie whose length may be suitably adjusted without it being necessary to impose, an over-tension on the tie and in which the consequences of fatigue at the anchoring devices are reduced.

Another object of this invention is to provide a tie made up by a plurality of stressed steel tendons enclosed in a protective sheath filled with hardened material, said tie including, at its ends, anchoring devices for the transfer of the pull of the tie to a structure, and the said sheath forming a conduit whose ends are fixed securely to said anchoring devices, the said conduit being isolated, throughout its length, from the structure so as to be capable of sliding longitudinally with respect thereto. At least one of the anchoring devices incorporates connection means for the active part of a tensioning apparatus, and also includes means for bearing against the structure. This bearing means is adjustable on the anchoring device in the longitudinal direction of the tie.

Thus, after an initial stressing of the tendons and the filling of the conduit with a hardenable liquid substance, the tie forms a rigid unit, the length of which may be modified by tension on at least one anchoring device and by displacing the associated bearing means along this anchoring device.

Preferably, at least one anchoring device includes an externally screw-threaded cylindrical extension and the bearing means is a nut engaged on the screw-thread.

Still another object of this invention is to provide a monolithic tie having an increased strength: in such advantageous embodiment, the tie conduit consists of a thin sheath over most of its length, whilst, towards each of the achoring devices, it is constituted by at least one strong and rigid tube, fixed securely to the tendons by means of the hardened protective material and rigidly connected to the corresponding anchoring device. The ends of the tie are therefore reinforced by the presence of these tubes, which compensates for the local weakening of the tendons due to their deviations from a straight path.

A further object of this invention is to provide an advantageous embodiment of the above mentioned tie, wherein the anchoring device at one end of the tie, which is equipped to receive a tensioning apparatus and provided with the adjustable bearing means, is also provided with fixed means for attachment of the corresponding ends of the tendons. At the other end of the tie, the other anchoring device is directly applied to the structure, and it is arranged for the tensioning and the anchoring of the tendons.

Thus, when the tie is placed in service, since the two anchoring devices are applied against the structure, the tendons forming the tie may be tightened, starting from the second end mentioned, up to the desired pull in the tie, after which the sheath and tubes are injected with the hardenable material. When an adjustment of the length of a tie becomes necessary, usually because of a certain creep of the steel tendons and of the concrete, this can be effected using the anchoring device provided at the first mentioned end of the tie.

Of course, the same end of the tie may be arranged both for the stressing of the tendons and for the adjustment of the length of the tie, or both ends of the tie may have provision for the length adjustment.

In a preferred embodiment of this invention the anchoring device includes a cylindrical, screw-threaded axial extension, and the adjustable bearing means is constituted by a nut which is applied against an annular bearing plate. In order to facilitate the positioning of the tensioning apparatus, preferably a hydraulic jack, the cylindrical extension is advantageously tubular and includes fixing means, for example a screw-thread, for one of the two parts of the tensioning apparatus. The other part of the tensioning apparatus, which is then applied against said annular bearing plate, is hollow in order to permit rotation of the nut.

Figure 2:
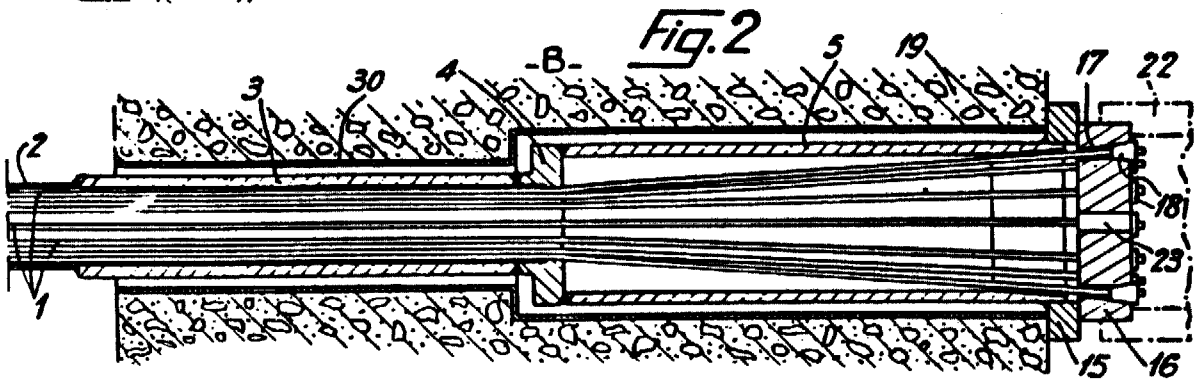
Figure 3:
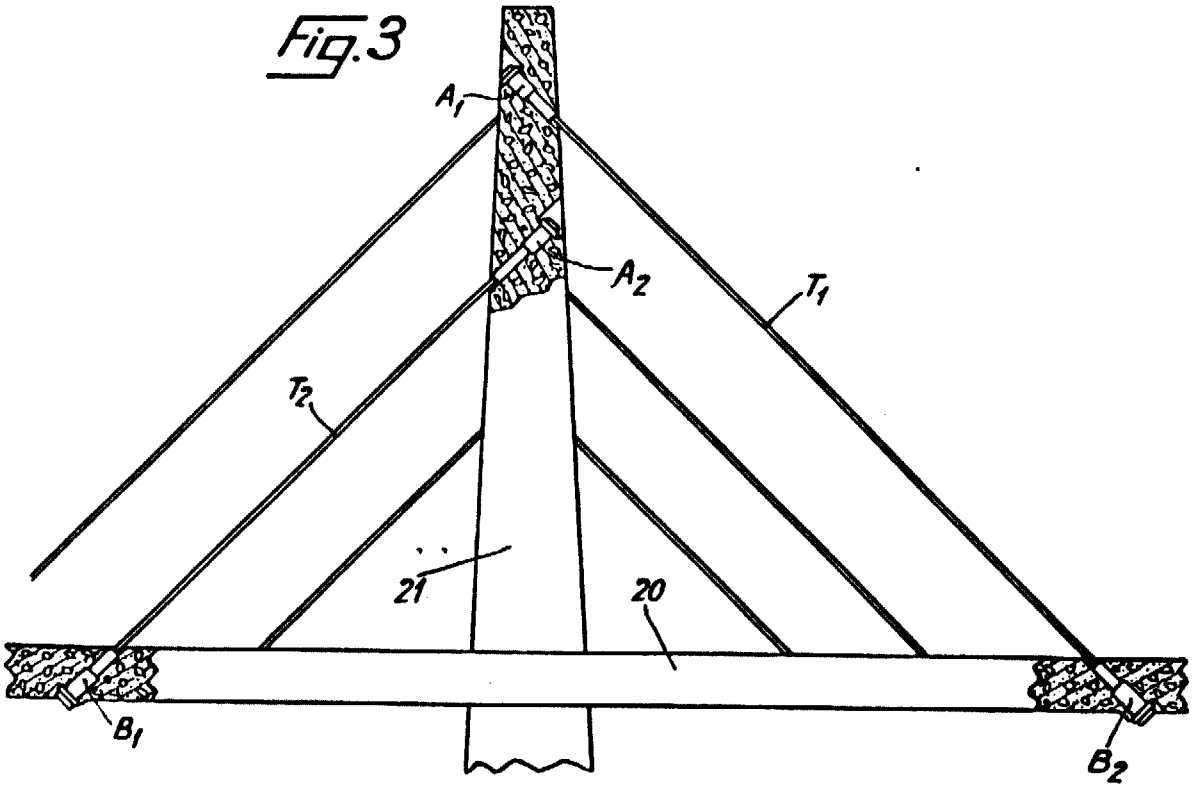

The invention will now be described, by way of example, with reference to the accompanying drawings, in which FIGS. 1 and 2 are, respectively, sectional views of the two ends of a tie in accordance with the invention, said tie being in place in a structure, and FIG. 3 is a schematic elevational view of an example of the application of the ties in accordance with the invention.

The tie shown in FIGS. 1 and 2 is composed, in its intermediate part, of steel tendons 1 enclosed in a thin cylindrical sheath 2 carefully filled with a hardenable material in the hardened state. This material, which may be a cement mortar or a polymerisable plastics material or a mixture of these two, binds the tendons together and to the sheath 2.

At each of the ends, respectively A and B, of the tie, the sheath 2 is replaced by a strong steel tube 3 of the same diameter. In order to ensure the splaying of the tendons and to permit their individual fixing in an anchor plate, the tubes 3 are connected by connectors 4 to strong tubes 5 of slightly greater diameter than, but which play the same role as the tubes 3. By their internal shape the connectors 4 ensure the correct bending of the tendons. The tubes 5 may be replaced by a frusto-conical tube connected to the tube 3.

Like the sheath 2, the tubes 3 and 5 are filled with a hardenable material which may be the same as that in the sheath, or if necessary stronger in order to ensure a better connection between the tendons and the tubes. For example the hardenable material in the tubes may be epoxy resin or epoxy mortar.

In the case of FIG. 1, the anchor plate 6 is traversed by the tendons 1 individually and these tendons are held against the external face of the plate 6 by grips 7 of any known type.

The plate 6 is securely fixed, by screw threads on its periphery, to a tube 8 which is applied on the end of the tube 5 and which is screw-threaded externally throughout its length. This external thread receives a nut 9 which transfers the pull in the tie to an annular bearing plate 10 and thence to the concrete forming part of the structure to which the end A of the tie is connected.

In order to protect the grips 7 and the ends of the tendons 1, the tube 8 is provided internally with a plug 32.

With the object of permitting an axial displacement of the tie, the latter is isolated from the concrete 11 by a tubular device 12 the variations in diameter of which correspond to the diameters of the tubes 3 and 5.

A sealing joint 13 prevents the penetration of water and foreign bodies into the gap comprised between the tubes 3 and 5 and the tubular device 12.

At the other end B of the tie, an annular bearing member 15 is welded to the end of the tube 5 and, against this member, rests an anchor plate 16 pierced with individual holes 17. These holes flair outwardly in order to receive individual anchoring wedges 18 for the tendons 1. As before, the assembly of tubes 3 and 5 is isolated from the concrete by a tubular device 30, which permits variations in the length of the tie in the concrete 19 forming another part of the structure to which the end B of the tie is connected.

The use of a tie in accordance with the invention will now be described with reference to FIG. 3 which shows schematically a bridge suspended by stays.

It is known that, in such bridges, the girder 20 forming the deck of the bridge is carried by at least one tower 21 by means of stays $T_1$, $T_2$... which are disposed parallel to one another on each side of the tower and have a fan-shaped arrangement.

In this example, the ends A of the stays are fixed to the tower and the ends B to the deck girder. This disposition may be reversed. It is also possible to arrange the end A in such a way as to permit in succession the first stressing and then the adjustment of the length of the stay at this same end, the end B then including a fixed anchorage.

In order to put the stay into service, the nut 9 is adjusted to the outer end of the tube 8. With the grips 7 in position, a pull is exerted on the tendons 1 by means of a jack whose body 22 bears against the plate 16. This stresses the tendons by pressing the annular bearing plates 10 and 15, respectively, against the concrete in 11 and 19, that is to say in the case of FIG. 3, against the tower 21 and the bridge deck 20, respectively.

When the level of the bridge deck is correctly adjusted, the sheath 2 and the two sets of tubes 3 and 5 are filled with hardenable material through an injection opening 23 at the end B, air being vented through a vent 24 at the end A.

When a readjustment of the length of the stay becomes necessary, the operation is performed at the end A. The body 26 of a jack is applied against the annular plate 10, whilst an extension 27 of its piston is engaged in the internal thread at the outer end of the tube 8. When the jack is placed under pressure, the nut 9 is freed and it may thus be progressed along the tube 8 a distance which is just sufficient to adapt to the necessary extension of the stay, for example, in order to re-establish precisely the original shape of the bridgedeck.

The invention is applicable to all structural works employing ties and especially to cable-stayed bridges.

I claim:

[1. In a tie constituted by a plurality of stressed steel tendons, enclosed in a protective sheath filled with hardended material and including, at its ends, anchoring devices for the transfer of the pull from the tie to a structure, the said sheath forms a conduit whose ends are fixed securely to said anchoring devices, the said conduit being isolated, throughout its length, from said structure so as to be longitudinally slidable with respect to the structure, at least one of said anchoring devices including connection means for the active part of a tensioning apparatus and also including means for bearing against the structure, said bearing means being adjustable on the anchoring device in the longitudinal direction of the tie.]

2. A tie according to claim [1] *5*, in which at least one [anchorage] *anchoring* device includes an externally screw-threaded, cylindrical extension, said extension receiving a nut and constituting, with an annular bearing plate, said adjustable bearing means.

3. A tie according to claim 2, in which said cylindrical extension is tubular and is provided internally with fixing means for one of two relatively movable parts of a tensioning apparatus, the other of said parts bearing against said annular *bearing* plate.

4. A tie according to claim [1] *5*, [including] *further comprising*, at one end, an anchoring device provided with fixed attachment means for the corresponding ends of the tendons and, at the other end, an anchoring device directly applied against the structure and arranged for the tensioning and anchoring of the tendons.

5. A tie [according to claim 1], *constituted by a plurality of stressed steel tendons, enclosed in a protective sheath filled with hardened material and including, at its ends,*

*anchoring devices for the transfer of the pull from the tie to a structure,*

*the said sheath having ends fixed securely to said anchoring devices,*

*the said sheath being isolated, throughout its length, from said structure so as to be longitudinally slidable with respect to the structure,*

*at least one of said anchoring devices including connection means for the active part of a tensioning apparatus and also including means for bearing against the structure,*

*said bearing means being adjustable on the anchoring device in the longitudinal direction of the tie,*

[in which] *wherein* the [conduit] *sheath* comprises a thin sheath over most of its length and, towards each of the anchoring devices, at least one strong [and rigid envelope] *tube* securely fixed to the tendons by the hardened material and rigidly connected to each of said anchoring devices [or to a bearing plate for the anchoring device.]

6. A tie according to claim 5, in which each of the anchoring devices comprises an anchor plate pierced with openings for the passage of the tendons and the ends of the said tendons are anchored near to the external face of the said anchor plate.

7. A tie according to claim 6, in which the [rigid envelope] *strong tube* is constituted by at least two sections having a diameter increasing towards the adjacent end of the tie, said sections being joined by a junction provided internally with a rounded portion for splaying the tendons in a conical pattern, said tendons passing through the anchor plate individually and being anchored against the external face of the latter.

8. A tie according to claim 5, in which the [rigid envelope] *strong tube* is constituted by a cylindrical part which is connected to a frusto-conical part, for splaying the tendons.

9. A tie according to claim 5, in which the hardenable material inside the [rigid] *strong* tubes is stronger and more adherent than the hardenable material inside the thin sheath.

[10. A construction structure comprising a plurality of stays extending between a couple of points of said structure distant from each other, each of said stay consisting of a tie constituted by a plurality of stressed steel tendons, enclosed in a protective sheath filled with hardened material and including, at its ends, anchoring devices for the transfer of the pull from the tie to the structure, the said sheath forming a conduit whose ends are fixed securely to said anchoring devices, the said conduit being isolated, throughout its length, from said structure so as to be longitudinally slidable with respect to the structure, at least one of said anchoring devices including connection means for the active part of a tensioning apparatus and also including means for bearing against the structure, said bearing means being adjustable on the anchoring device in the longitudinal direction of the tie.]

*11. A tie according to claim 5, wherein at least one of said anchoring devices comprises a bearing plate and said strong and rigid envelope is rigidly connected to said bearing plate of at least one of said anchoring devices.*

*12. A construction structure comprising:*

*a plurality of stays extending each between a couple of points of the structure distant from each other, each of said stays consisting of a tie constituted by a plurality of stressed steel tendons, enclosed in a protective sheath filled with hardended material.*

*anchoring devices at each end of each stay for the transfer of the pull from the tie to the structure,*

*said protective sheath having ends fixedly secured to each of said anchoring devices, with said sheath being isolated, throughout its length, from said structure so as to be longitudinally slidable with respect to the structure,*

*said structure including a tubular device within said structure between said sheath and said structure, said tubular device being isolated, throughout its length, from said sheath so that said sheath is longitudinally slidable with respect to said tubular device,*

*at least one of said anchoring devices including connection means for the active part of a tensioning apparatus and also including means for bearing against the structure, said bearing means being adjusted on the anchoring device in the longitudinal direction of the tie.*

*13. A construction structure according to claim 12, further comprising sealing means disposed between said tubular device and said sheath for sealing at least one end thereof.*

*14. A tie comprising:*

*a plurality of stressed steel tendons enclosed in a protective sheath filled with hardended material,*

*a first anchoring device at one end of said tie and a second anchoring device at the other end of said tie for the transfer of the pull from the tie to a structure,*

*said sheath having ends fixedly secured to said anchoring devices, with said sheath being isolated, throughout its length, from said structure so as to be longitudinally slidable with respect to the structure,*

*a tubular device within said structure, with said tubular device being isolated, throughout its length, from said sheath so that said sheath is longitudinally slidable with respect to said tubular device,*

*at least one of said anchoring devices including connection means for the active part of a tensioning apparatus and also including bearing means against the structure,*

*said bearing means being adjusting on the anchoring device in the longitudinal direction of the tie.*

*15. A tie according to claim 14, wherein at least one of said anchoring devices further comprises attachment means for the corresponding ends of the tendons, whereby the ends of said tendons may extend through said attachment means and be attached thereto.*

*16. A tie according to claim 14, further comprising an externally screw-threaded, cylindrical extension, said extension receiving a nut and constituting, with said bearing plate, said adjusting means.*

*17. A tie according to claim 14, wherein said cylindrical extension is tubular and is provided internally with fixing means for one of two relatively movable parts of a tensioning apparatus, the other of said parts bearing against said annular bearing plate.*

* * * * *